July 24, 1928.
J. G. BLUNT
1,678,321
TRUCK FOR LOCOMOTIVE ENGINES
Filed April 21, 1926    2 Sheets-Sheet 1
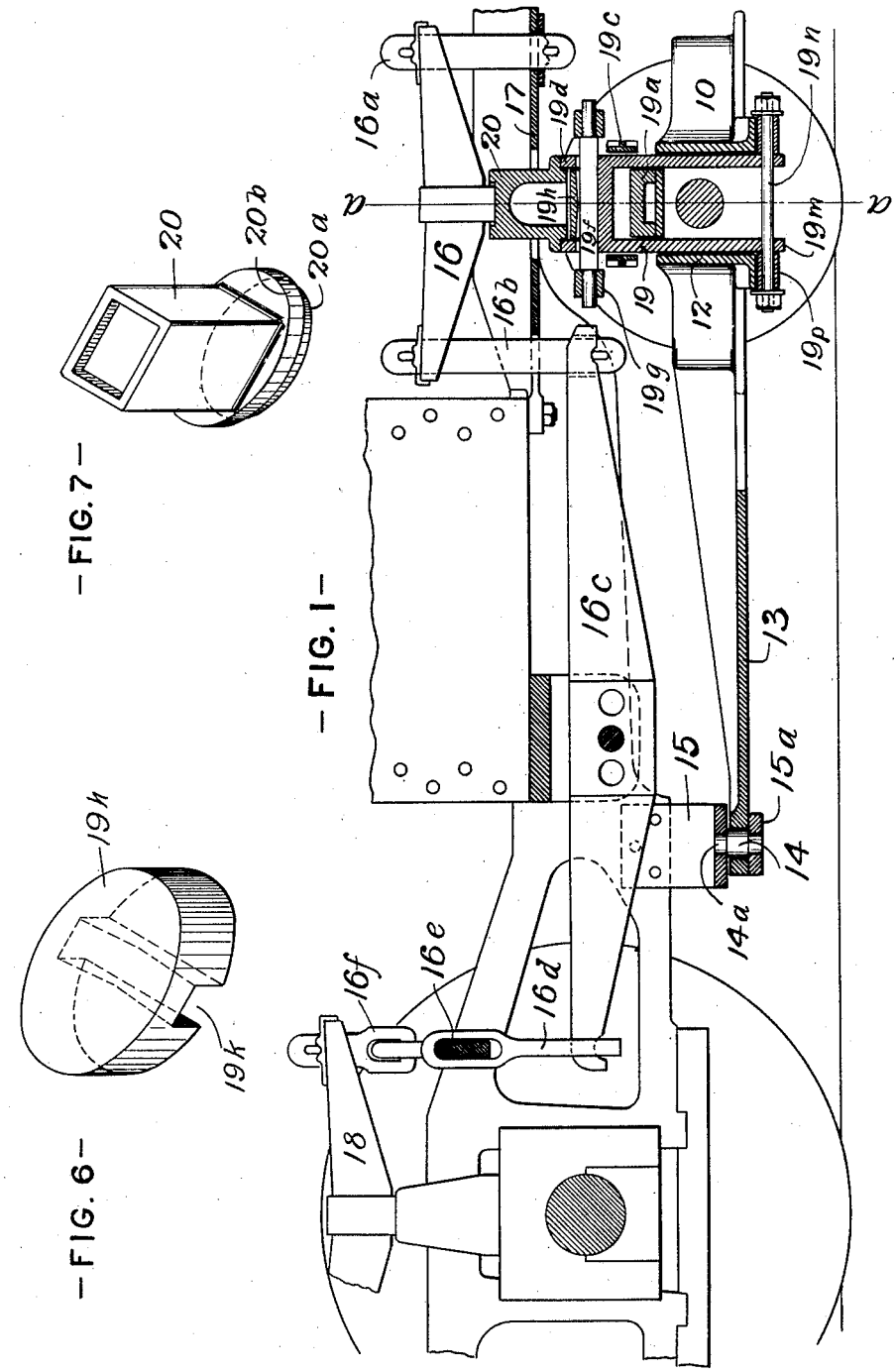
WITNESSES
A. S. Vanderbilt
S. R. Bell
INVENTOR
James G. Blunt.
by J. Snowden Bell
Atty

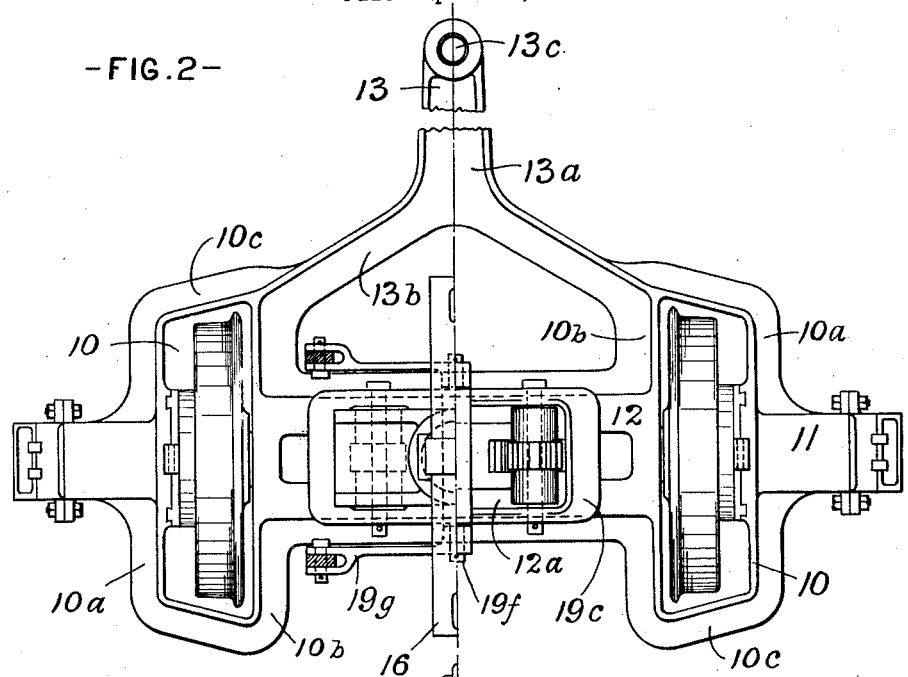
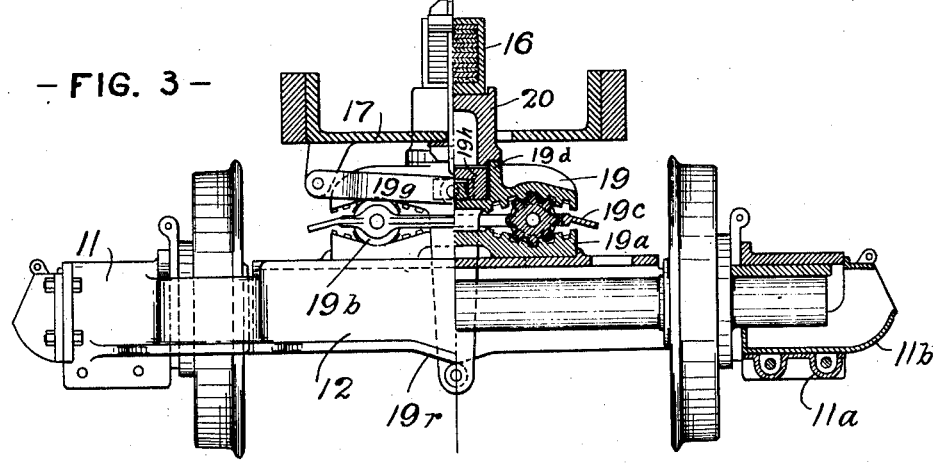

Patented July 24, 1928.

1,678,321

UNITED STATES PATENT OFFICE.

JAMES G. BLUNT, OF SCHENECTADY, NEW YORK.

TRUCK FOR LOCOMOTIVE ENGINES.

Application filed April 21, 1926. Serial No. 103,457.

This invention relates to locomotive trucks of the outside bearing type, and has for an object the provision of a truck, which comprises a minimum number of parts, which can be manufactured at a low cost, which is adapted to efficiently perform the various radial, lateral, vertical and component movements desirable in service, which possesses great strength, durability, and stability, and which enables the journal boxes to be conveniently inspected, their cellars readily supplied with lubricant, and their bearing brasses easily renewed.

A further object of the invention is the provision of improved means for transmitting the load to the truck.

The improvement claimed is hereinafter fully set forth.

In the accompanying drawings: Figure 1, is a central, longitudinal, vertical section, through a leading truck embodying my invention, showing its application to the front end of a locomotive; Fig. 2, a plan view of the truck, one half being shown with the top roller seat and superposed parts removed; Fig. 3, a front view of the truck, one half being in elevation, and the other half in section on the line a a, Fig. 1; Figs. 4 and 5, a side view, and an end view, respectively, in elevation, of the upper roller seat; Fig. 6, an isometric view of the circular block; and Fig. 7, an isometric view of the spring seat.

In the practice of my invention, referring descriptively to the specific embodiment thereof which is herein exemplified, as applied in a two wheel, leading truck, the truck frame is preferably a one-piece or integral structure comprising a horizontal loop, 10, at each end, adapted to receive and extend across a wheel. Each loop comprises two side portions, substantially parallel with the plane of the wheel, one of the portions, 10ª, being disposed at the outer side of the wheel, and the other portion, 10ᵇ, at the inner side of the wheel. The side portions are connected together, at each end, by end portions, 10ᶜ, extending across the tread of the wheel. The outer portion, 10ª of each loop has integrally formed with it a journal box, 11, comprising a top and two side walls.

The wheel loops are joined together by a transverse load supporting beam, 12, of substantially inverted U-shape, in transverse section, the sides of which straddle the axle, and depend therebelow. Each end of the beam is joined to its respective loop inwardly of the ends thereof, for the purpose of providing as much clear space as possible.

A radius tongue, 13, is preferably formed integral with the truck and comprises a bar portion, 13ª, extending in the longitudinal, central, vertical plane of the truck, from one end of which portion, extend two diverging portions, 13ᵇ, which are joined to the wheel loops. The other end of the bar portion is provided with a bore, 13ᶜ, having a spherical bearing face, which works against the enlarged cylindrical surface of the radius pin, 14, to permit the truck to accommodate itself to various track elevations, without imposing a bending stress on the tongue, or the pin. Each end of the pin, 14, has a reduced portion, 14ª, one of which seats in the cross bar, 15, and the other in the clip, 15ª.

From the foregoing description, it will be noted that this invention enables the radius bar, the transverse load supporting beam, the wheel loops, and the journal boxes to be combined in a one piece casting. This improvement effects a substantial economy in the cost of manufacture, and by obviating bolted, riveted, or welded joints between the parts, provides a construction of maximum strength and durability, whereby the factor of safety is materially increased, and the cost of maintenance substantially reduced. Further the formation of the journal boxes integral with the loops is a novel and advantageous departure from the usual practice of slidably mounting the journal boxes between pedestals.

Each journal box is formed without a bottom wall, to enable convenient insertion of the axle, and the opening at the bottom is closed by a spacer, 11ª, which serves as a guide to facilitate slidable insertion of the cellar, 11ᵇ. Each cellar has combined with it a detachable cover, and laterally extending end flanges by which the cellar is bolted to the journal box.

The weight of the locomotive imposed on the truck is transmitted through a semielleptic spring, 16, disposed in the longitudinal, central, vertical plane of the truck. The front end of the spring is connected to the deck casting, 17, by a hanger, 16ª, and the rear end of the spring is connected by the hanger, 16ᵇ, to the front end of the longitudinally disposed equalizing lever 16ᶜ, which is pivoted intermediate its length to a fulcrum bracket on the cylinder saddle, the rear end of the lever is connected by a hanger, 16ᵈ, to the cross equalizer, 16ᵉ, which is connected by the hangers, 16ᶠ, to the driver springs, 18. By this means the weight imposed on the drivers and the leading truck wheels is equalized therebetween.

A lateral motion device is provided which comprises an upper bearing member, 19, and a lower bearing member, 19ᵃ, between which members is interposed a pair of rollers, 19ᵇ, each roller having an intermediate portion provided with gear teeth. Each bearing member has a pair of bearing seats for the rollers, each seat having oppositely inclined portions, and an intermediate rack, with which the teeth of the rollers mesh. The rollers are mounted in a cage or frame, 19ᶜ, by which they are spaced and guided.

The upper bearing member, 19, has at its top a hollow cylindrical, vertical extension, 19ᵈ, on which a cylindrical spring seat, 20, is mounted. The spring seat has a lower portion, 20ᵃ, which fits within the cylindrical extension, and a lateral flange, 20ᵇ, which bears on the top of the cylindrical extension. This construction permits the truck to swivel to accommodate itself to curved track.

In order to provide for the turning of the upper bearing member with the truck, the cylindrical extension, 19ᵈ, is provided on diametrically opposite sides with horizontal slots, 19ᵉ, through each of which, a pin, 19ᶠ, extends. The ends of the pin are each pivotally connected to one end of one of the arms, 19ᵍ. The other end of each of the arms is pivotally connected to the locomotive frame structure. Within the cylindrical extension, 19ᵈ, is fitted a circular block, 19ʰ, the underside of which is provided with a diametrically extending groove, 19ᵏ, in which the pin, 19ᶠ, fits. The top of the groove is provided with oppositely inclined portions to permit the angular rise and fall of the truck.

In order to hold the upper and lower bearing members in proper relation to each other, and in engagement with the rollers, the upper bearing member is provided with two depending arms, 19ᵐ, which fit within the side walls of the transverse beam, 12, and straddle the axle. The lower ends of the arms project below the side walls of the beam, and are connected together by a pin, 19ⁿ, which carries at each end a roller, 19ᵖ, adapted to bear on flanges, 19ʳ, formed at the bottom of each side wall of the beam. The flanges have oppositely inclined portions, whose angle of inclination is such that undesirable separation of the bearing members is prevented. In order to permit the necessary traverse of the arms, 19ᵐ, the top of the transverse beam is provided with longitudinal slots, 12ᵃ, through which the arms extend. These slots are made of limited length to limit the lateral traverse of the truck.

The invention claimed and desired to be secured by Letters Patent, is:

1. A frame member for locomotive trucks of the outside bearing type, formed as an integral casting, and comprising a horizontal loop at each end, adapted to receive and fit across a wheel, a transverse member connecting the loops, and a journal box in the outer portion of each loop.

2. In a locomotive truck of the outside bearing type, the combination of a frame member, formed as an integral casting, and comprising a horizontal loop at each end, adapted to receive and fit across a wheel, a transverse member connecting the loops, and a journal box in the outer portion of each loop; a lubricant cellar in each journal box; and a detachable cover closing the outer end of each journal box.

3. In a locomotive truck of the two-wheel outside-bearing type, the combination of a pair of wheels mounted on an axle; a frame, comprising a horizontal loop at each end, receiving and fitted across one of the wheels, each loop comprising two end portions extending across the tread of the wheel, and inner and outer portions joining the end portions, a journal box integrally formed with the outer portion of each loop, and a transverse member connecting the loops and joined to the inner portions thereof, inwardly of the end portions; and a radius bar joined to the frame.

4. In a locomotive truck of the two-wheel, outside-bearing type, the combination of a pair of wheels mounted on an axle; a one-piece frame, comprising a horizontal loop at each end, receiving and fitted across one of the wheels; each loop comprising two end portions extending across the tread of the wheel, and inner and outer portions joining the end portions, a journal box in the outer portion of each loop, and a transverse member connecting the loops and joined to the inner portions thereof inwardly of the end portions; and a radius bar joined to the frame.

5. In a locomotive truck of the outside bearing type, the combination of a frame member, formed as an integral casting, and comprising a horizontal loop at each end, adapted to receive and fit across a wheel, a transverse member connecting the loops, and a journal box in the outer portion of each loop; and a combined lubricant cellar and journal box cover detachably fastened to each journal box.

6. In a locomotive truck, of the two-wheel, outside-bearing type, the combination of a frame member, comprising a horizontal loop at each end, adapted to receive and fit across a wheel, a transverse member connecting the loops, a journal box integrally formed with the outer portion of each loop; and a radius tongue connected to the frame member.

7. In a locomotive truck of the two-wheel, outside-bearing type, the combination of a frame comprising two horizontal loops, each adapted to receive and fit across a wheel, and a transverse member connecting the loops; a journal box in the outer portion of each loop; and a radius bar rigidly connected to the frame.

8. In a locomotive truck of the two-wheel outside-bearing type, the combination of an integral frame comprising two horizontal loops, each adapted to receive and fit across a wheel, and a transverse member connecting the loops; a journal box in the outer portion of each loop; and a lateral motion device mounted on the frame.

9. In a locomotive truck of the two-wheel, outside-bearing type, the combination of a frame comprising two horizontal loops, each adapted to receive and fit across a wheel, a transverse member connecting the loops and a journal box in the outer portion of each loop; and a lateral motion device mounted on the frame, comprising upper and lower bearing members, and means interposed between said members adapted to permit relative lateral movement of the members, when a side thrust is encountered, and coacting with said member to automatically restore the members to their normal relative positions when the side thrust is withdrawn.

10. In a locomotive truck of the two-wheel, outside-bearing type, the combination of an integral frame comprising two horizontal loops, each adapted to receive and fit across a wheel, and a transverse member connecting the loops, and a journal box in the outer portion of each loop; and a lateral motion device mounted on the frame, comprising upper and lower bearing members, means interposed between said members adapted to permit relative lateral movement thereof when a side thrust is encountered, and coacting with the members to automatically restore them to their normal relative positions, when the side thrust is withdrawn; and a pair of arms pivotally connected at one end to the upper bearing member, and having their other ends adapted for pivotal connection to a portion of the locomotive supported by the truck.

11. In a locomotive truck of the two-wheel, outside-bearing type, the combination of a frame; journal boxes supported in the frame outside of the wheels; a lateral motion device mounted on the frame, and a semi-elliptic spring mounted on the lateral motion device, for transmitting the load to the truck, said spring being disposed lengthways in the central, longitudinal, vertical plane of the truck.

12. The combination of a locomotive frame; and a two wheel truck comprising a transversely extending load carrying beam, straddling the axle, a journal box disposed outside of each truck wheel; and a lateral motion device consisting of upper and lower toothed roller seats, and toothed rollers disposed between said seats, the upper roller seat being connected to the locomotive frame, and free to turn with the truck.

JAMES G. BLUNT.